(12) United States Patent
Gauvreau et al.

(10) Patent No.: US 10,082,029 B2
(45) Date of Patent: Sep. 25, 2018

(54) INTERNAL COMBUSTION ENGINE WITH ROTOR HAVING OFFSET PERIPHERAL SURFACE

(71) Applicant: PRATT & WHITNEY CANADA CORP., Longueuil (CA)

(72) Inventors: Jean-Gabriel Gauvreau, Varennes (CA); David Gagnon-Martin, Longueuil (CA); Andre Julien, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 125 days.

(21) Appl. No.: 15/205,198

(22) Filed: Jul. 8, 2016

(65) Prior Publication Data

US 2018/0010456 A1    Jan. 11, 2018

(51) Int. Cl.
  *F01C 21/08*    (2006.01)
  *F02B 53/08*    (2006.01)
  (Continued)

(52) U.S. Cl.
  CPC .............. *F01C 21/08* (2013.01); *F01C 1/22* (2013.01); *F02B 37/00* (2013.01); *F02B 53/08* (2013.01); *F02B 2053/005* (2013.01)

(58) Field of Classification Search
  CPC .. F01C 21/08; F01C 1/22; F02B 37/00; F02B 53/08; F02B 2053/005
  (Continued)

(56) References Cited

U.S. PATENT DOCUMENTS

| 2,988,008 A | * | 6/1961 | Wankel | F02B 53/00 418/113 |
| 2,988,065 A | * | 6/1961 | Wankel | F01C 1/22 123/242 |

(Continued)

FOREIGN PATENT DOCUMENTS

| CN | 2249826 | 3/1997 |
| CN | 1228506 | 9/1999 |

(Continued)

OTHER PUBLICATIONS

Yamamoto, Kenichi, Section 4.5, Effect of Rotor Recess, Rotary Engine, 1981, pp. 47 to 49, Sankaido Co., Ltd, Tokyo, Japan.

(Continued)

*Primary Examiner* — Jason Newton
(74) *Attorney, Agent, or Firm* — Norton Rose Fulbright Canada LLP

(57) ABSTRACT

A rotary engine where the rotor cavity has a peripheral inner surface having a peritrochoid configuration defined by a first eccentricity and the rotor has a peripheral outer surface having a peritrochoid inner envelope configuration defined by a second eccentricity larger than the first eccentricity. Also, a rotary engine where the rotor cavity has a peripheral inner surface having a peritrochoid configuration defined by an eccentricity, and a rotor with a peripheral outer surface between adjacent ones of the apex portions being inwardly offset from a peritrochoid inner envelope configuration defined by the eccentricity. The engine may have an expansion ratio with a value of at most 8. The rotary engine may be part of a compound engine system.

23 Claims, 5 Drawing Sheets

(51) Int. Cl.
*F02B 37/00* (2006.01)
*F01C 1/22* (2006.01)
*F02B 53/00* (2006.01)

(58) Field of Classification Search
USPC ......... 123/18 A, 18 R, 43 A, 45 A, 200–249
See application file for complete search history.

(56) References Cited

U.S. PATENT DOCUMENTS

| | | | |
|---|---|---|---|
| 3,102,492 | A | 9/1963 | Bentele et al. |
| 3,134,337 | A | 5/1964 | Paschke |
| 3,171,590 | A | 3/1965 | Bentele et al. |
| 3,196,847 | A | 7/1965 | Kimberley et al. |
| 3,226,013 | A * | 12/1965 | Sakakibara ............ F01C 1/104 418/116 |
| 3,244,154 | A | 4/1966 | Löhmer |
| 3,246,636 | A | 4/1966 | Bentele |
| 3,249,095 | A | 5/1966 | Hamada |
| 3,253,580 | A * | 5/1966 | Eberhard ............... F01C 1/22 123/205 |
| 3,297,005 | A | 1/1967 | Lamm |
| 3,344,778 | A | 10/1967 | Bensinger |
| 3,398,724 | A | 8/1968 | Lamm et al. |
| 3,405,695 | A | 10/1968 | Jones et al. |
| 3,584,607 | A | 6/1971 | Yamamoto |
| 3,696,796 | A | 10/1972 | Gavrun |
| 3,698,364 | A | 10/1972 | Jones |
| 3,699,929 | A | 10/1972 | Bennethum |
| 3,703,885 | A | 11/1972 | Feller |
| 3,793,996 | A | 2/1974 | Scheerer |
| 3,795,227 | A | 3/1974 | Jones |
| 3,830,599 | A | 8/1974 | Poehlman |
| 3,847,517 | A | 11/1974 | Hermes et al. |
| 3,855,972 | A | 12/1974 | Roberts |
| 3,858,557 | A | 1/1975 | Myers et al. |
| 3,929,106 | A | 12/1975 | Scott |
| 3,990,817 | A | 11/1976 | Ruf et al. |
| 3,994,266 | A | 11/1976 | Jones |
| 4,008,001 | A | 2/1977 | Tsujibayashi |
| 4,059,370 | A | 11/1977 | Gibson |
| 4,066,044 | A | 1/1978 | Jones et al. |
| 4,080,934 | A | 3/1978 | Jones |
| 4,141,126 | A | 2/1979 | Okada |
| 4,169,451 | A | 10/1979 | Niggemeyer |
| 5,168,846 | A | 12/1992 | Paul et al. |
| 5,251,595 | A | 10/1993 | Wei-Min |
| 5,343,838 | A | 9/1994 | Abraham |
| 5,431,551 | A * | 7/1995 | Aquino ..................... F01C 1/22 418/113 |
| 5,692,372 | A | 12/1997 | Whurr |
| 5,979,395 | A | 11/1999 | Mallen et al. |
| 6,162,034 | A | 12/2000 | Mallen |
| 6,244,240 | B1 | 6/2001 | Mallen |
| 6,321,713 | B1 | 11/2001 | Mallen |
| 6,435,851 | B2 | 8/2002 | Mallen |
| 6,892,692 | B2 | 5/2005 | Barrett |
| 6,951,211 | B2 | 10/2005 | Bryant |
| 7,500,461 | B2 | 3/2009 | Baier et al. |
| 7,753,036 | B2 | 7/2010 | Lents et al. |
| 7,775,044 | B2 | 8/2010 | Julien et al. |
| 7,942,126 | B2 | 5/2011 | Zoller |
| 9,027,345 | B2 | 5/2015 | Julien |
| 9,638,093 | B2 | 5/2017 | Blank |
| 9,664,047 | B2 | 5/2017 | McDaniel et al. |
| 2008/0141972 | A1 | 6/2008 | Morrison et al. |
| 2009/0007882 | A1 | 1/2009 | Lents et al. |
| 2012/0227397 | A1 | 9/2012 | Willi et al. |
| 2013/0025567 | A1 | 1/2013 | Villeneuve et al. |
| 2014/0147320 | A1 | 5/2014 | Gauvreau et al. |
| 2014/0245988 | A1 | 9/2014 | Thomassin et al. |

FOREIGN PATENT DOCUMENTS

| | | |
|---|---|---|
| CN | 1673500 | 9/2005 |
| EP | 0594849 | 5/1994 |
| EP | 2011962 | 1/2009 |
| EP | 2497902 | 9/2012 |
| GB | 1487118 | 9/1977 |
| GB | 2097474 | 11/1982 |
| JP | 60001327 | 1/1985 |
| WO | 87/04494 | 7/1987 |

OTHER PUBLICATIONS

NASA Contractor Report 189106, vol. 1, Stratified Charge Rotary Engine Critical Technology Enablement, vol. 1, 1992, pp. 20 to 94, C.E. Irion and R.E. Mount, Wood-Ridge, New Jersey.

* cited by examiner

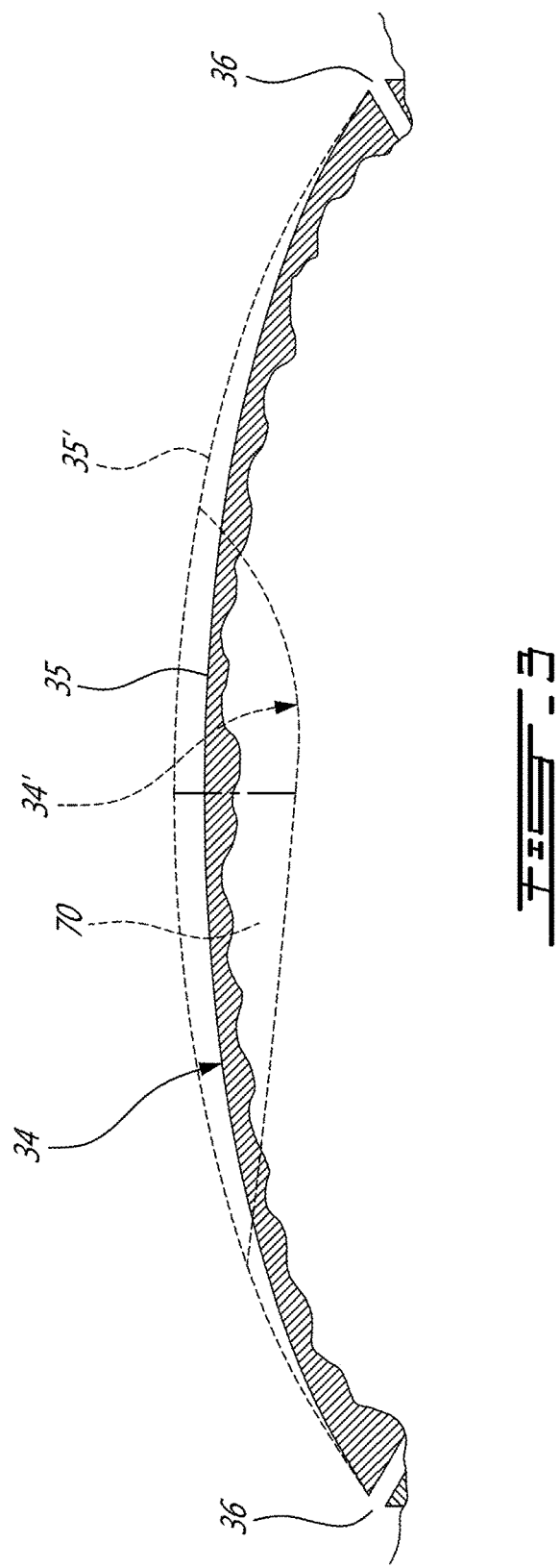

INTERNAL COMBUSTION ENGINE WITH ROTOR HAVING OFFSET PERIPHERAL SURFACE

TECHNICAL FIELD

The application relates generally to rotary internal combustion engines and, more particularly, to rotors for such engines.

BACKGROUND OF THE ART

Wankel rotary engines typically include recesses in the rotor flanks, and the recess volume is used to adjust the compression and expansion ratios of the engine as well as the minimum volume available for combustion. In some instances, the maximum desirable recess volume may limit the available compression ratio, expansion ratio and/or minimum volume available for combustion.

SUMMARY

In one aspect, there is provided a rotary engine comprising: a housing defining a rotor cavity with a peripheral inner surface having a peritrochoid configuration defined by a first eccentricity $e_H$; and a rotor rotationally received in the rotor cavity, the rotor having a peripheral outer surface defining a plurality of circumferentially spaced apex portions each including an apex seal biased away from the peripheral outer surface and engaging the peripheral inner surface of the rotor cavity, the peripheral outer surface of the rotor having a peritrochoid inner envelope configuration defined by a second eccentricity $e_R$, the second eccentricity $e_R$ being larger than the first eccentricity $e_H$.

In another aspect, there is provided a compound engine system comprising: a rotary engine having a housing defining a rotor cavity with a peripheral inner surface having a peritrochoid configuration defined by an eccentricity $e_H$, and a rotor rotationally received in the rotor cavity, the rotor having a peripheral outer surface defining a plurality of circumferentially spaced apex portions each including an apex seal biased away from the peripheral outer surface and engaging the peripheral inner surface of the rotor cavity, the peripheral outer surface of the rotor between adjacent ones of the apex portions being inwardly offset from a peritrochoid inner envelope configuration defined by the eccentricity $e_H$; a compressor communicating with an inlet port of the rotary engine; and a turbine connected to an exhaust port of the rotary engine.

In a further aspect, there is provided a rotary engine comprising: a housing defining a rotor cavity with a peripheral inner surface having a peritrochoid configuration defined by an eccentricity $e_H$; and a rotor rotationally received in the rotor cavity, the rotor having a peripheral outer surface defining a plurality of circumferentially spaced apex portions each including an apex seal biased away from the peripheral outer surface and engaging the peripheral inner surface of the rotor cavity, the peripheral outer surface of the rotor between adjacent ones of the apex portions being inwardly offset from a peritrochoid inner envelope configuration defined by the eccentricity $e_H$; wherein the engine has an expansion ratio $r_{EXP}$ defined by $$\frac{V_{MAX} + V_R}{V_{MIN} + V_R},$$

where $V_R$ is a volume of any recess defined in the peripheral surface between the adjacent ones of the apex portions, $V_{MAX}$ is a maximum volume of a chamber defined between the peripheral inner surface of the rotor cavity and the peripheral outer surface of the rotor during rotation of the rotor, and $V_{MIN}$ is a minimum volume of the chamber; wherein the expansion ratio $r_{EXP}$ has a value of at most 8.

DESCRIPTION OF THE DRAWINGS

Reference is now made to the accompanying figures in which:

FIG. 3 is a schematic cross-sectional view of part of a peripheral surface of a rotor of a Wankel engine according to a particular embodiment, as compared with a prior art rotor shown in dotted lines;

DETAILED DESCRIPTION

Figure 1:
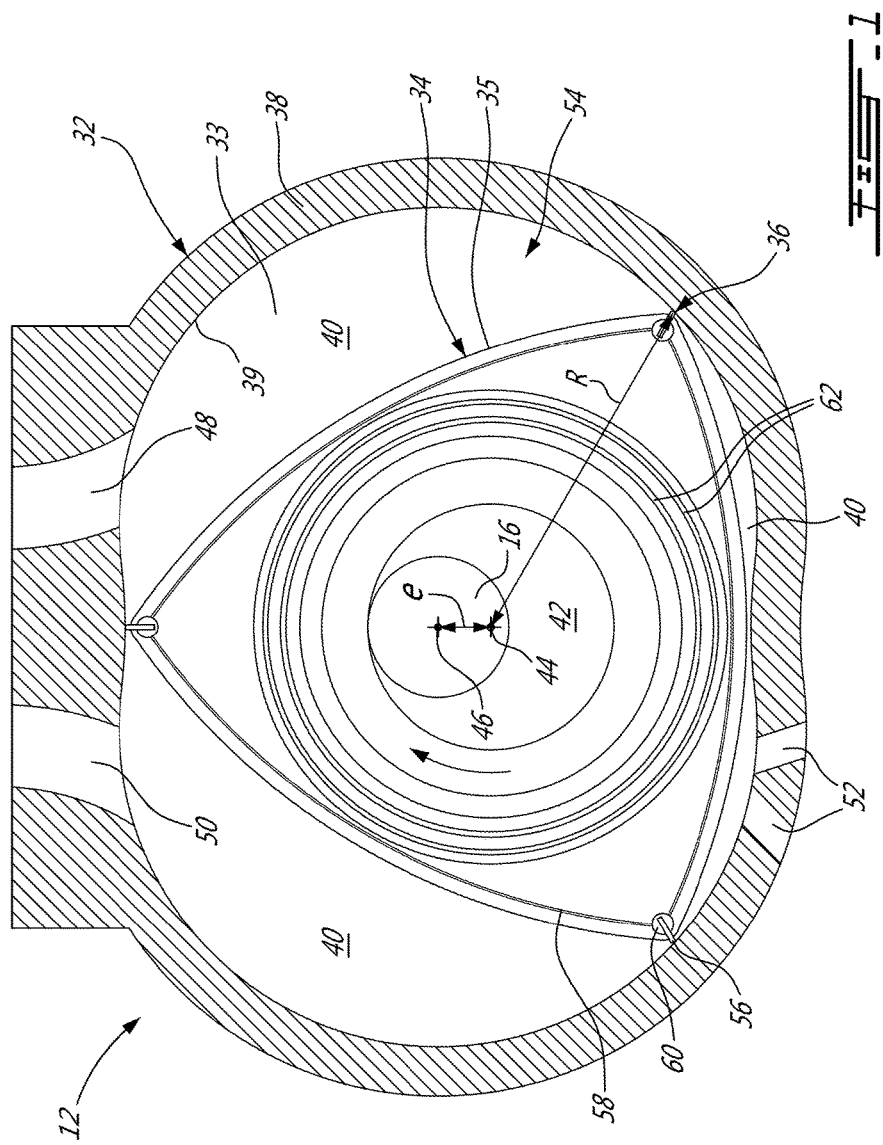
FIG. 1 is a schematic cross-sectional view of a Wankel engine.

FIG. 1 illustrates an example of a rotary intermittent internal combustion engine 12 of the type known as a Wankel engine. It is understood that the configuration of the engine 12, e.g. placement of ports, number and placement of seals, etc., may vary from that of the embodiment shown.

The engine 12 comprises a housing 32 defining a rotor cavity 33 having a profile defining two lobes. The housing 32 has a peripheral wall 38 extending between two axially spaced apart end walls 54 to enclose the rotor cavity 33. A rotor 34 is received within the rotor cavity 33. The rotor 34 has a peripheral outer surface 35 defining three circumferentially-spaced apex portions 36, and a generally triangular profile with outwardly arched sides. The apex portions 36 are in sealing engagement with the peripheral inner surface 39 of the rotor cavity 33, defined by the peripheral wall 38 of the housing 32, to form and separate three working chambers 40 of variable volume between the rotor 34 and the housing 32.

Figure 2B:
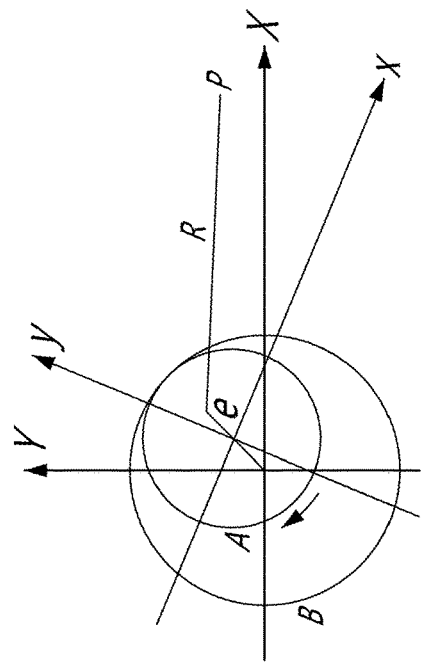
FIGS. 2A and 2B are schematic representations of the generation of the geometry of a peripheral inner surface of a rotor cavity and of a peripheral outer surface of a rotor, respectively, of a Wankel engine in accordance with the prior art.
Figure 2A:
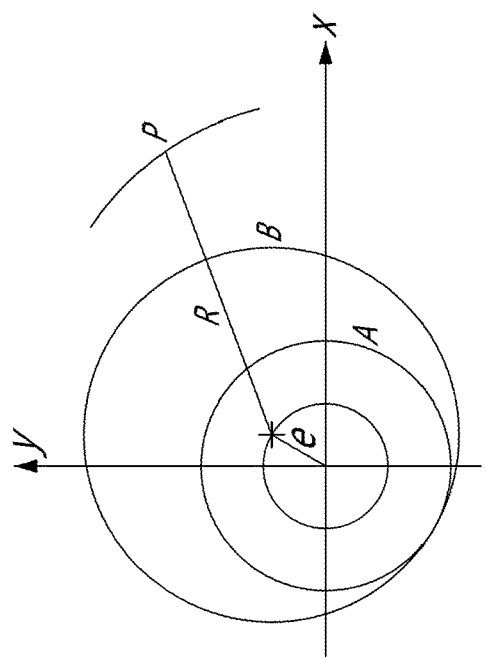

Referring to FIG. 2A, in known Wankel engines the peripheral inner surface 39 of the rotor cavity 33 is shaped to correspond or substantially correspond to a peritrochoid, defined by the locus of the tip point P of an arm fixed on a revolving circle B when it rolls along the periphery of a base circle A. The center distance between the revolving and base circles is defined as the eccentricity e and the length of the arm fixed on the revolving circle is defined as the generating radius R. In practice, the peripheral inner surface 39 of the rotor cavity 33 often corresponds to a peritrochoid with a generating radius R which has been moved outward in parallel by a constant amount a (not shown), which closely approximates that of a peritrochoid having a generating radius of R+a.

Referring to FIG. 2B, in known Wankel engines the peripheral outer surface 35 of the rotor 34 is shaped to correspond or substantially correspond to the inner envelope of the peritrochoid, defined by the inner line of the pattern drawn by the peritrochoid of the rotor cavity 33 (i.e. same generating radius R and eccentricity e) fixed on the circle A when it rolls along the inner surface of the stationary circle B. In practice, the peripheral outer surface 35 of the rotor 34 often corresponds to the inner envelope of the peritrochoid with the generating radius R which has been moved outward in parallel by a constant amount a' (not shown), which closely approximates that of the inner envelope of a peritrochoid having a generating radius of R+a', where a'=a+a minimum clearance determined based on errors in manufacturing, thermal deformation, bearing clearance, etc.

The ratio of the generating radius R to the eccentricity (R/e) defines a trochoid constant K, a parameter which may be used to characterize the geometry of the rotor 34 and rotor cavity 33. Practical values of K are usually from 6 to 8, although other values can be used. Smaller values of K produce rotors having a periphery approaching a triangular shape whereas larger values produce rotors having a periphery approaching a circle.

Referring back to FIG. 1, the rotor 34 is engaged to an eccentric portion 42 of an output shaft 16 to perform orbital revolutions within the rotor cavity 33. The output shaft 16 performs three rotations for each orbital revolution of the rotor 34. The geometrical axis 44 of the rotor 34 is parallel to the axis 46 of the housing 32, and offset therefrom by a distance corresponding to the eccentricity e. During each orbital revolution, each chamber 40 varies in volume and moves around the rotor cavity 33 to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug or other ignition mechanism, as well as for one or more fuel injectors of a fuel injection system (not shown in FIG. 1) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded apex seals 56 extending from the peripheral outer surface 35 of the rotor 34 at each apex portion 36 to engage the peripheral inner surface 39 of the rotor cavity 33, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

Referring to FIG. 3, the peripheral outer surface of a prior art rotor 34' having a geometry as detailed above in relation to FIG. 2B is illustrated in dotted lines. The peripheral outer surface 35' usually includes a recess 70 in each flank, i.e. in the peripheral outer surface 35' between adjacent ones of the apex portions 36. The inclusion of a recess 70 lowers the compression ratio of the engine to practicable values (which otherwise could be for example from 15:1 to 21:1 for values of K from 6 to 8), and allows a volume for the initial combustion since it occurs when the chamber 40 is positioned at its minimum volume.

The expansion ratio $r_{EXP}$ of a Wankel engine can be defined by:

$$r_{EXP} = \frac{V_{MAX} + V_R}{V_{MIN} + V_R}$$

where $V_R$ is the volume of the recess 70 defined in the peripheral outer surface 35, 35' in each flank of the rotor (if present), $V_{MAX}$ is the maximum volume of the chamber 40 defined between the peripheral inner surface 39 and the peripheral outer surface 35, 35' (i.e. without the recess volume), and $V_{MIN}$ is the minimum volume of that chamber 40. The compression ratio is typically similar or identical to the expansion ratio (e.g. Otto cycle) or lower than the expansion ratio (e.g. Miller cycle obtained by moving the intake port 48 closer to top dead center (TDC)).

The rotor 34 according to a particular embodiment shown in full lines in FIG. 3 achieves similar expansion and compression ratios than the prior art rotor 34' shown in dotted lines by increasing the size of the minimum volume $V_{MIN}$ and decreasing the size of the recess volume $V_R$. The recess 70 can accordingly be omitted (as shown) or a smaller recess may be present. The increase in minimum volume is obtained by flattening the shape of the peripheral outer surface 35 of the rotor 34, using a suitable convex shape which is contained within the conventional inner envelope of the peritrochoid (as shown by the peripheral outer surface 35' in dotted lines). In the embodiment shown, the convex shape of the peripheral outer surface 35 corresponds to that of the conventional inner envelope of the peritrochoid at the apex portions 36, and is offset inwardly from the conventional peritrochoid inner envelope between the apex portions 36 by a distance progressively increasing from each apex portion 36 toward the center of the flank.

In a particular embodiment, the offset peripheral outer surface 35 of the rotor 34 has a profile corresponding to a peritrochoid inner envelope configuration (i.e. a profile corresponding or substantially corresponding to a peritrochoid inner envelope) having the same or a similar radius R as the peritrochoid configuration of the rotor cavity 33, but an eccentricity $e_R$ greater than the eccentricity $e_H$ of the peritrochoid configuration of the rotor cavity 33; by contrast, conventional rotary engines use the same eccentricity e for the rotor and rotor cavity. The size of the rotor eccentricity $e_R$ relative to the rotor cavity eccentricity $e_H$ is represented by the following ratio:

$$\frac{e_R - e_H}{e_H};$$

in a particular embodiment, the ratio $$\frac{e_R - e_H}{e_H}$$

has any of the following values: any non-zero value up to and including 40%; larger than 0 and at most 30%; larger than 0 and at most 20%; larger than 0 and at most 10%; at least 10%; at least 20%; at least 30%; at least 10% and at most 40%; at least 20% and at most 40%; at least 30% and at most 40%. Other values are also possible, including values higher than 40%.

Alternately, the peripheral outer surface 35 of the rotor 34 can have any other suitable convex shape offset inwardly from the conventional peritrochoid inner envelope. For example, the offset peripheral outer surface 35 of the rotor 34 can have a profile corresponding to a peritrochoid inner envelope configuration having a radius R different from that of the peritrochoid configuration of the rotor cavity 33.

Figure 4:
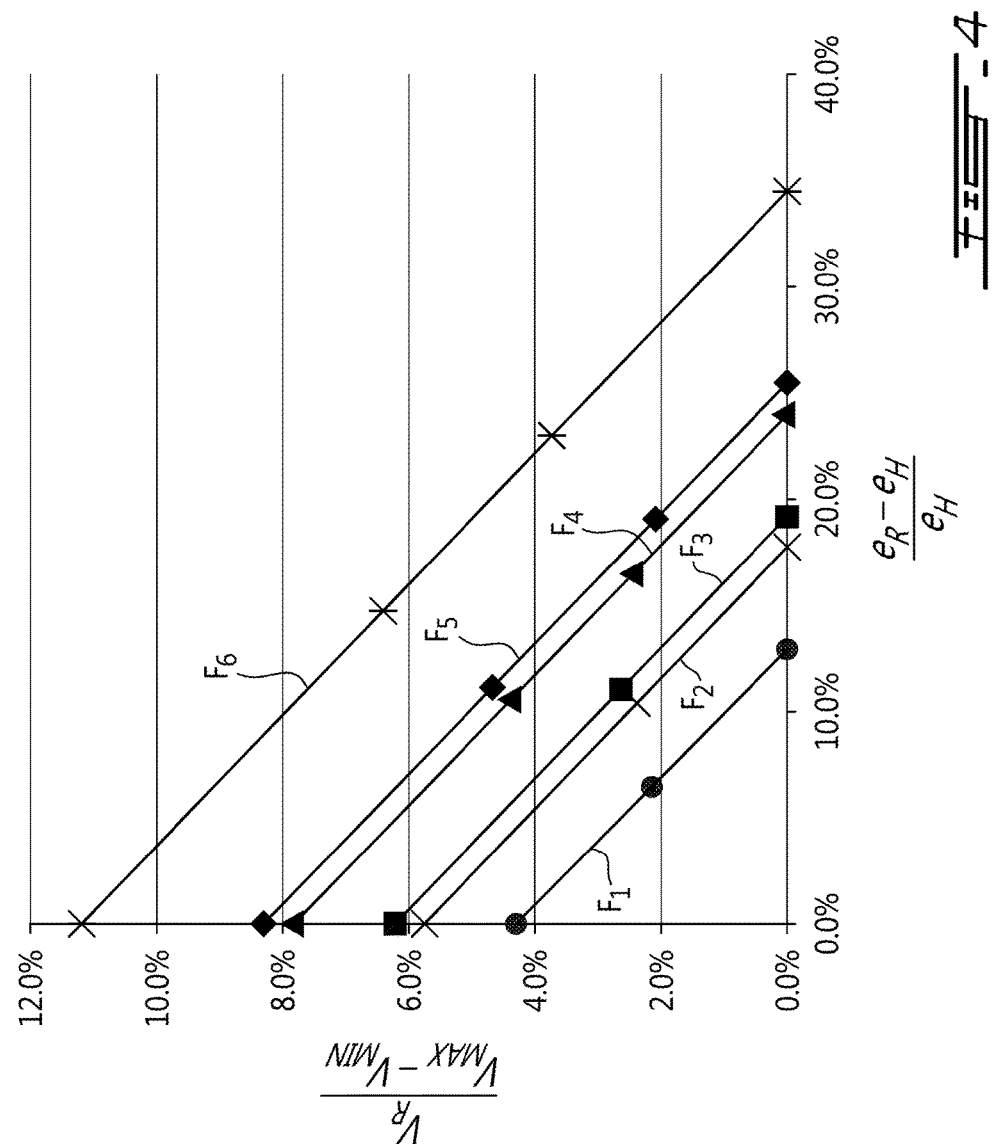
FIG. 4 is a graphic of a relationship between a relative size of a rotor recess and a relative size of a rotor eccentricity as a function of multiple combinations of expansion ratios and rotor cavity trochoid constants, in accordance with particular embodiment.

FIG. 4 provides examples of how the recess volume $V_R$ is adjusted for a given ratio between the rotor eccentricity $e_R$ and the rotor cavity eccentricity $e_H$ and a given trochoid constant $K_H$ ($R/e_H$) of the rotor cavity 33, in order to obtain a desired expansion ratio $r_{EXP}$ (and compression ratio). The graph shows the size of the recess volume relative to the rotor displacement, as illustrated by ratio $$\frac{V_R}{V_{MAX} - V_{MIN}},$$

as a function of the size of the rotor eccentricity relative to the rotor cavity eccentricity, as illustrated by ratio $$\frac{e_R - e_H}{e_H},$$

for the combinations of expansion ratio $r_{EXP}$ and trochoid constant K listed in Table 1 below:

TABLE 1

| function | $r_{EXP}$ | $K_H$ (R/$e_H$) |
|---|---|---|
| $F_1$ | 8 | 6 |
| $F_2$ | 7.5 | 6.9 |
| $F_3$ | 7.5 | 7.75 |
| $F_4$ | 6.5 | 6.9 |
| $F_5$ | 6.5 | 7.75 |
| $F_6$ | 5.5 | 8 |

In a particular embodiment, the engine 12 with the offset peripheral outer surface 35 of the rotor 34 has an expansion ratio $r_{EXP}$ having any of the following values: 8 or less; 7.5 or less; from 5.5 to 7.5; from 5 to 7.5; from 5.5 to 8; from 5 to 8; about 6.5 and/or a trochoid constant $K_H$ of the rotor cavity having any of the following values: at least 6; at most 8; from 6 to 8; about 6.9; about 7.75. For example, respective values for the trochoid constant $K_H$ of the rotor cavity and for the expansion ration $r_{EXP}$ of the engine 12 may correspond to any combination found in table 1. Other values are also possible. In a particular embodiment, these expansion ratios are obtained without having any recess in the rotor flank, i.e. with $V_R$=0. In a particular embodiment, the compression ratio is similar or identical to the expansion ratio. In another embodiment (e.g. Miller cycle) the compression ratio is lower than the expansion ratio.

In a particular embodiment, the engine 12 with the offset peripheral outer surface 35 has the same expansion ratio $r_{EXP}$ as a similar engine with a prior art rotor 34' having a geometry as detailed above in relation to FIG. 2B and having a recess volume $V_R$ of between 5% and 15% of the displacement volume, at least 6% and at most 11% of the displacement volume, and/or about 8 to 10% of the displacement volume. The engine 12 with the offset peripheral outer surface 35 achieves the same expansion ratio $r_{EXP}$ as this engine with the prior art rotor 34', but with a lower recess volume $V_R$ or without any recess being defined in the rotor flank.

Figure 5:
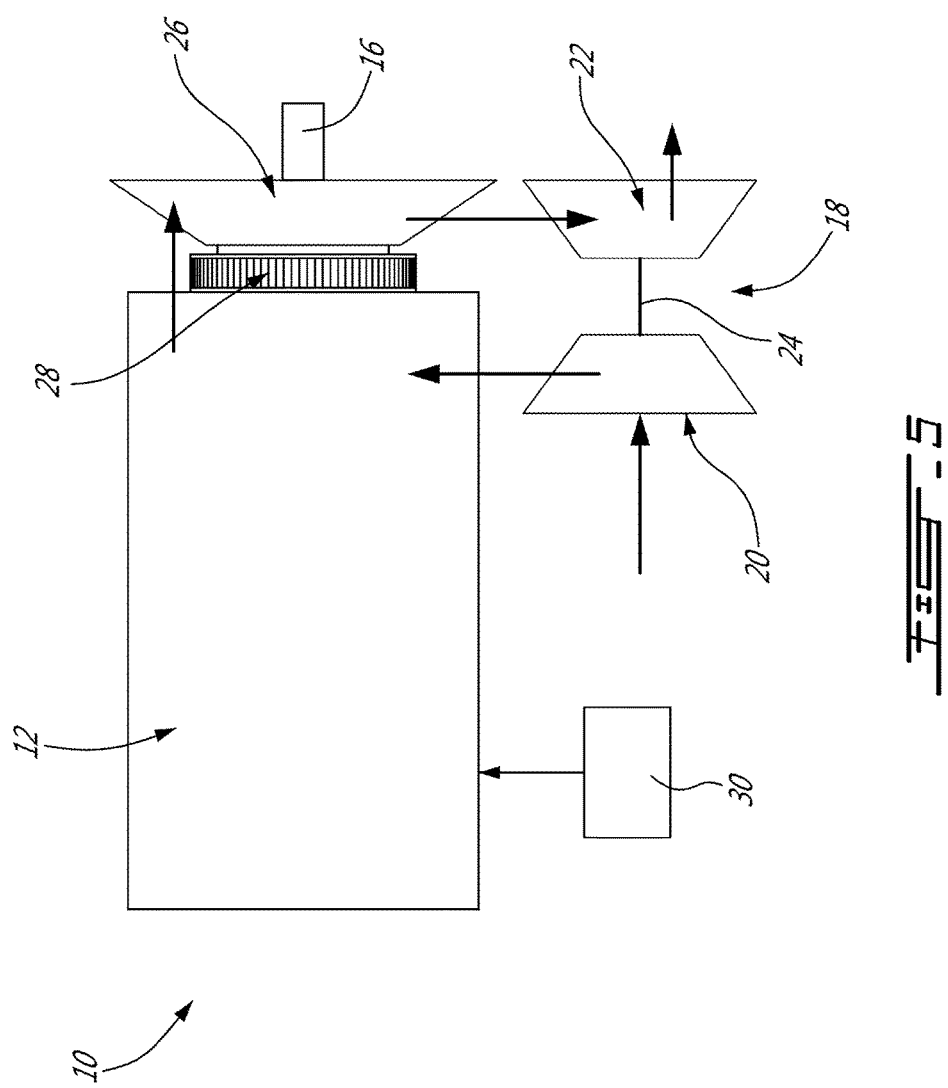
FIG. 5 is a schematic representation of a compound engine system in which a rotary engine having a rotor such as shown in FIG. 3 and/or a combination of geometric parameters such as illustrated by FIG. 4 can be used.

The rotary engine 12 is particularly, although not exclusively, suitable to be used in a turbo compounded cycle, since the low compression ratio providing for reduced performance of the rotary engine 12 allows more energy to be recovered in compounding. Accordingly, in a particular embodiment illustrated by FIG. 5, the rotary engine 12 is used in a compound engine system 10 where one or more rotary engines 12 drive a common load connected to the output shaft 16. The fuel injector(s) of the engine 12, which in a particular embodiment are common rail fuel injectors, communicate with a source 30 of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere. The compound engine system 10 also includes a turbocharger 18, including a compressor 20 and a turbine 22 which are drivingly interconnected by a shaft 24, with the compressor 20 of the turbocharger 18 compressing the air before it enters the rotary engines(s) 12. The exhaust flow from the rotary engine(s) 12 is supplied to a compound turbine 26 in fluid communication therewith, also driving the common load, for example connected to the output shaft 16 through an appropriate type of transmission 28. The exhaust flow from the first stage turbine 26 is supplied to the second stage turbine 22 of the turbocharger 18.

The compound engine system 10 may be as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein.

In a particular embodiment, the low compression ratio obtained through the configuration of the offset peripheral outer surface 35 for the rotor 34 allows to boost the inlet pressure higher for a similar peak pressure and therefore have higher power density, while the unused energy is recovered in the expansion via the turbines 22, 26.

In a particular embodiment, the expansion ratio of the turbines 26, 22 is selected such that the turbine section provides a power output corresponding to from 20% to 35% of the total power output of the compound engine system 10. In a particular embodiment, this may be achieved by having an expansion ratio in the turbine section which is similar to the boost compression pressure ratio, i.e. the compression pressure ratio of the compressor 20.

The increased power output of the turbine section may provide increased power for a given air mass flow, which may result in a smaller, lighter and more efficient engine at a given power. The low volumetric compression ratio of the rotary engine 12 may help heavy fuel (e.g. diesel, kerosene (jet fuel), equivalent biofuel) to remain at a pressure low enough to prevent self-ignition which may help ensure that the cycles runs with direct injection with a source of ignition, may save structural weight, and may reduce internal leakages.

Alternately, the rotary engine 12 may be used without the turbocharger 18 and/or without the compound turbine 26, and with or without one or more other rotary engine(s) 12 engaged to the same output shaft 16. In a particular embodiment, the rotary engine 12 is used as or part of an automobile engine. In a particular embodiment, the rotary engine 12 is used as or part of an aircraft engine (prime mover engine or APU).

In a particular embodiment, the shape of the rotor 34 having an offset peripheral outer surface 35 without recesses provides for a geometry which is less complex to manufacture either by casting or machining, exposes less area to the combustion chamber 40 and/or prevents local "hot spots" caused by the increased material thickness which would otherwise have been present at the junctions defined at the ends of the recess. In a particular embodiment, the shape of the rotor 34 is closer to a triangular shape than a conventional Wankel rotor, and accordingly may be smaller and/or lighter.

In a particular embodiment, rotor 34 having an offset peripheral outer surface 35 is symmetrical and as such can be installed on both sides without affecting the combustion chamber geometry with any engine rotation direction. The symmetrical geometry may lead to a reduction in the number of different parts in the engine thus facilitating an increased production volume of a single part, help prevent the installation of the rotor in the wrong position (which could occur with a non-symmetric rotor) and/or help reduce a potential for manufacturing errors resulting from having different rotor configurations.

The above description is meant to be exemplary only, and one skilled in the art will recognize that changes may be made to the embodiments described without departing from the scope of the invention disclosed. For example, although the rotor cavity has been described with two lobes and the rotor with three apex portions, alternately the Wankel engine could have a rotor cavity with any suitable number n of lobes and the rotor any number n+1 of apex portions. Still other modifications which fall within the scope of the present invention will be apparent to those skilled in the art, in light of a review of this disclosure, and such modifications are intended to fall within the appended claims.

The invention claimed is:

1. A rotary engine comprising:
   a housing defining a rotor cavity with a peripheral inner surface having a peritrochoid configuration defined by a first eccentricity $e_H$; and
   a rotor rotationally received in the rotor cavity, the rotor having a peripheral outer surface defining a plurality of circumferentially spaced apex portions each including an apex seal biased away from the peripheral outer surface and engaging the peripheral inner surface of the rotor cavity, the peripheral outer surface of the rotor having a peritrochoid inner envelope configuration defined by a second eccentricity $e_R$, the second eccentricity $e_R$ being larger than the first eccentricity $e_H$.

2. The rotary engine as defined in claim 1, wherein the peritrochoid configuration of the peripheral inner surface of the rotor cavity and the peritrochoid inner envelope configuration of the peripheral outer surface of the rotor have a same generating radius.

3. The rotary engine as defined in claim 1, wherein a ratio $$\frac{e_R - e_H}{e_H}$$

has a value of at most 40%.

4. The rotary engine as defined in claim 1, wherein the ratio $$\frac{e_R - e_H}{e_H}$$

has a value of at least 10%.

5. The rotary engine as defined in claim 1, wherein the rotary engine has an expansion ratio of at most 8.

6. The rotary engine as defined in claim 1, wherein the expansion ratio has a value of at least 5.

7. The rotary engine as defined in claim 4, wherein the rotary engine has a compression ratio corresponding to the expansion ratio.

8. The rotary engine as defined in claim 1, wherein a trochoid constant of the rotor cavity defined as $R/e_H$ has a value of at least 6, R corresponding to a value of a generating radius of the peritrochoid configuration.

9. The rotary engine as defined in claim 1, wherein a trochoid constant of the rotor cavity defined as $R/e_H$ has a value of at most 8, R corresponding to a value of a generating radius of the peritrochoid configuration.

10. The rotary engine as defined in claim 1, wherein the engine has a rotor cavity trochoid constant $K_H$ and an expansion ration $r_{EXP}$ having respective values corresponding to any combination selected from the group consisting of: $r_{EXP}$=8 and $K_H$=6; $r_{EXP}$=7.5 and $K_H$=6.9; $r_{EXP}$=7.5 and $K_H$=7.75; $r_{EXP}$=6.5 and $K_H$=6.9; $r_{EXP}$=6.5 and $K_H$=7.75; $r_{EXP}$=5.5 and $K_H$=8.

11. The rotary engine as defined in claim 1, wherein the peritrochoid configuration has two lobes and the rotor has three apex portions.

12. A compound engine system including the rotary engine as defined in claim 1, the compound engine system further comprising:
    a compressor communicating with an inlet port of the rotary engine; and
    a turbine connected to an exhaust port of the rotary engine.

13. A compound engine system comprising:
    a rotary engine having a housing defining a rotor cavity with a peripheral inner surface having a peritrochoid configuration defined by an eccentricity $e_H$, and a rotor rotationally received in the rotor cavity, the rotor having a peripheral outer surface defining a plurality of circumferentially spaced apex portions each including an apex seal biased away from the peripheral outer surface and engaging the peripheral inner surface of the rotor cavity, the peripheral outer surface of the rotor between adjacent ones of the apex portions being inwardly offset from a peritrochoid inner envelope configuration defined by the eccentricity $e_H$;
    a compressor communicating with an inlet port of the rotary engine; and
    a turbine connected to an exhaust port of the rotary engine.

14. The compound engine system as defined in claim 13, wherein an expansion ratio $r_{EXP}$ of the rotary engine is defined by $$\frac{V_{MAX} + V_R}{V_{MIN} + V_R},$$

where $V_R$ is a volume of any recess defined in the peripheral surface between the adjacent ones of the apex portions, $V_{MAX}$ is a maximum volume of a chamber defined between the peripheral inner surface of the rotor cavity and the peripheral outer surface of the rotor during rotation of the rotor, and $V_{MIN}$ is a minimum volume of the chamber, the expansion ratio having a value of at most 8.

15. The compound engine system as defined in claim 14, wherein $V_R$ has a value of 0.

16. The compound engine system as defined in claim 14, wherein the expansion ratio has a value of at least 5.

17. The compound engine system as defined in claim 14, wherein the rotary engine has a compression ratio corresponding to the expansion ratio.

18. The compound engine system as defined in claim 14, wherein the expansion ratio has a value of about 6.5.

19. The compound engine system as defined in claim 13, wherein a trochoid constant of the rotor cavity defined as $R/e_H$ has a value of at least 6, R corresponding to a value of a generating radius of the peritrochoid configuration.

20. The compound engine system as defined in claim 13, wherein a trochoid constant of the rotor cavity defined as $R/e_H$ has a value of at most 8, R corresponding to a value of a generating radius of the peritrochoid configuration.

21. The compound engine system as defined in claim 13, wherein respective values for a trochoid constant $K_H$ of the rotor cavity and for an expansion ration $r_{EXP}$ of the rotary engine correspond to any combination selected from the group consisting of: $r_{EXP}$=8 and $K_H$=6; $r_{EXP}$=7.5 and $K_H$=6.9; $r_{EXP}$=7.5 and $K_H$=7.75; $r_{EXP}$=6.5 and $K_H$=6.9; $r_{EXP}$=6.5 and $K_H$=7.75; $r_{EXP}$=5.5 and $K_H$=8.

22. The compound engine system as defined in claim 13, wherein the peritrochoid configuration has two lobes and the rotor has three apex portions.

23. A rotary engine comprising:

a housing defining a rotor cavity with a peripheral inner surface having a peritrochoid configuration defined by an eccentricity $e_H$; and a rotor rotationally received in the rotor cavity, the rotor having a peripheral outer surface defining a plurality of circumferentially spaced apex portions each including an apex seal biased away from the peripheral outer surface and engaging the peripheral inner surface of the rotor cavity, the peripheral outer surface of the rotor between adjacent ones of the apex portions being inwardly offset from a peritrochoid inner envelope configuration defined by the eccentricity $e_H$;

wherein the engine has an expansion ratio $r_{EXP}$ defined by $$\frac{V_{MAX} + V_R}{V_{MIN} + V_R},$$

where $V_R$ is a volume of any recess defined in the peripheral surface between the adjacent ones of the apex portions, $V_{MAX}$ is a maximum volume of a chamber defined between the peripheral inner surface of the rotor cavity and the peripheral outer surface of the rotor during rotation of the rotor, and $V_{MIN}$ is a minimum volume of the chamber;

wherein the expansion ratio $r_{EXP}$ has a value of at most 8.

* * * * *